US012630461B2

(12) United States Patent
Nonaka et al.

(10) Patent No.: US 12,630,461 B2
(45) Date of Patent: May 19, 2026

(54) GLASS COMPOSITION FOR GLASS FIBER, GLASS FIBER, GLASS FIBER WOVEN FABRIC, AND GLASS FIBER REINFORCED RESIN COMPOSITION

(71) Applicant: NITTO BOSEKI CO., LTD., Fukushima (JP)

(72) Inventors: Takashi Nonaka, Fukushima (JP); Jun Ito, Fukushima (JP); Takahiro Utsugi, Fukushima (JP); Koichi Nakamura, Fukushima (JP); Norio Hirayama, Narashino (JP); Hidero Unuma, Yonezawa (JP)

(73) Assignee: Nitto Boseki Co., Ltd., Fukushima (JP)

( * ) Notice: Subject to any disclaimer, the term of this patent is extended or adjusted under 35 U.S.C. 154(b) by 597 days.

(21) Appl. No.: 18/020,292

(22) PCT Filed: Dec. 23, 2021

(86) PCT No.: PCT/JP2021/047874
§ 371 (c)(1),
(2) Date: Feb. 8, 2023

(87) PCT Pub. No.: WO2022/138823
PCT Pub. Date: Jun. 30, 2022

(65) Prior Publication Data
US 2023/0312394 A1 Oct. 5, 2023

(30) Foreign Application Priority Data
Dec. 23, 2020 (JP) ................................. 2020-213162

(51) Int. Cl.
*C03C 3/091* (2006.01)
*C03C 13/00* (2006.01)

(52) U.S. Cl.
CPC .............. *C03C 3/091* (2013.01); *C03C 13/00* (2013.01); *C03C 2213/00* (2013.01)

(58) Field of Classification Search
CPC ........................... C03C 13/00; C03C 2213/00
See application file for complete search history.

(56) References Cited

U.S. PATENT DOCUMENTS

| | | | |
|---|---|---|---|
| 4,824,806 A * | 4/1989 | Yokoi ................. H05K 1/0366 | 501/67 |
| 2001/0008864 A1 | 7/2001 | Tamura et al. | |
| 2004/0175557 A1 | 9/2004 | Creux et al. | |
| 2007/0135291 A1 | 6/2007 | Bernard et al. | |
| 2015/0259242 A1 | 9/2015 | Tezuka | |
| 2019/0255473 A1* | 8/2019 | Gao ..................... B01D 39/163 | |
| 2020/0087196 A1 | 3/2020 | Inaka et al. | |
| 2022/0055942 A1 | 2/2022 | Tanaka | |

FOREIGN PATENT DOCUMENTS

| | | | | |
|---|---|---|---|---|
| EP | 1086930 A1 * | 3/2001 | ............. | C03C 3/118 |
| JP | 2000-233942 A | 8/2000 | | |
| JP | 2002-137937 A | 5/2002 | | |
| JP | 2002-137938 A | 5/2002 | | |
| JP | 2004-525066 A | 8/2004 | | |
| JP | 2007-507413 A | 3/2007 | | |
| JP | 2015-174791 A | 10/2015 | | |
| TW | 201908260 A | 3/2019 | | |
| WO | 2020/121761 A1 | 6/2020 | | |

OTHER PUBLICATIONS

The extended European search report dated Sep. 12, 2024 issued in the corresponding EP Patent Application No. 21910962.6.
Office Action/Search Report dated May 15, 2024 issued in the corresponding Taiwanese Patent Application No. 110148412 with the English machine translation thereof.

* cited by examiner

*Primary Examiner* — Benjamin L Utech
(74) *Attorney, Agent, or Firm* — Carrier, Shende & Associates P.C.; Joseph P. Carrier; Fulchand P. Shende

(57) ABSTRACT

To provide a glass composition for glass fiber that includes biosolubility and can achieve long fiber formation. The glass composition for glass fiber of the present invention includes $SiO_2$ in the range of 35.0 to 55.0% by mass, $B_2O_3$ in the range of 10.0 to 30.0% by mass, $Al_2O_3$ in the range of 14.5 to 30.0% by mass, and CaO and MgO in the range of 8.7 to 25.0% by mass in total, with respect to the total amount, and the content S of $SiO_2$, the content B of $B_2O_3$, the content A of $Al_2O_3$, the content C of CaO, and the content M of MgO satisfy the following formula (1):

$$11.3 \leq S \times (C+M)/(A+B) \leq 20.7 \qquad (1).$$

10 Claims, No Drawings

GLASS COMPOSITION FOR GLASS FIBER, GLASS FIBER, GLASS FIBER WOVEN FABRIC, AND GLASS FIBER REINFORCED RESIN COMPOSITION

TECHNICAL FIELD

The present invention relates to a glass composition for glass fiber, glass fiber formed from the glass composition for glass fiber, a glass fiber woven fabric formed from the glass fiber, and a glass fiber-reinforced resin composition including the glass fiber.

BACKGROUND ART

Short glass fiber has been conventionally required to have biosolubility, which is a property of being dissolved in physiological fluids such as lung fluid (e.g., see Patent Literature 1).

Short glass fiber is produced in a flocculent form by blowing off a glass melt by high pressure air, centrifugal force, or the like, packed in a bag or covered with a jacket material, and used for construction materials such as insulating materials and sound-absorbing materials, and the like. In the production process or use process of short glass fiber, extremely thin fiber may be rarely generated. In order to reduce health risks due to inhalation and accumulation of such extremely thin fiber in a human body, biosolubility is important for short glass fiber.

In contrast, long glass fiber is a produced in a yarn form by flowing a viscosity-controlled glass melt out from a nozzle and winding the melt with a winding apparatus. The long glass fiber produced is cut to a predetermined length, or woven or knitted for use in a glass fiber-reinforced resin composition or a glass fiber-reinforced resin molded article or the like, which is a composite material with a resin. Long glass fiber often has a thick fiber diameter than that of short glass fiber, and extremely thin fiber is extremely unlikely to be generated therefrom in the production process or use process. Thus its biosolubility has not been considered important.

However, reduction in the weight, thickness, length, and size in printed wiring boards including a glass fiber-reinforced resin molded article, especially a glass fiber woven fabric has been under progress in recent years, and accordingly, extremely thin long glass fiber also has been demanded. For this reason, biosolubility will be considered to be an important property also for long glass fiber in the future.

CITATION LIST

Patent Literature

Patent Literature 1: National Publication of International Patent Application No. 2007-507413

SUMMARY OF INVENTION

Technical Problem

However, it is disadvantageously difficult to obtain long glass fiber from a glass composition of which biosolubility is observed in short glass fiber.

Thus, an object of the present invention is to provide a glass composition for glass fiber that comprises biosolubility and that can achieve long fiber formation by eliminating the disadvantage.

Solution to Problem

In order to achieve the object, the glass composition for glass fiber of the present invention includes $SiO_2$ in the range of 35.0 to 55.0% by mass, $B_2O_3$ in the range of 10.0 to 30.0% by mass, $Al_2O_3$ in the range of 14.5 to 30.0% by mass, and CaO and MgO in the range of 8.7 to 25.0% by mass in total, with respect to the total amount, and the content S of $SiO_2$, the content B of $B_2O_3$, the content A of $Al_2O_3$, the content C of CaO, and the content M of MgO satisfy the following formula (1):

$$11.3 \leq S \times (C + M)/(A + B) \leq 20.7. \tag{1}$$

Assuming that the content of $SiO_2$ is S, the content of $B_2O_3$ is B, the content of $Al_2O_3$ is A, the content of CaO is C, and the content of MgO is M, with respect to the total amount, in the glass composition for glass fiber of the present invention, when the above S, B, A, C, and M satisfy the formula (1), on formation of glass fiber, biosolubility can be obtained, and long fiber formation can be achieved.

In the glass composition for glass fiber of the present invention, the above S, B, A, C, and M preferably satisfy the following formula (2):

$$12.5 \leq (A + 0.9 \times B)^3 \times (3 \times C + 2 \times M)/S^3 \leq 70.2. \tag{2}$$

In the glass composition for glass fiber of the present invention, the above S, B, A, C, and M preferably satisfy the following formula (3):

$$11.3 \leq S \times (C + M)/(A + B) \leq 19.3. \tag{3}$$

The glass composition for glass fiber of the present invention, when the above S, B, A, C, and M satisfy the following formula (3), on formation of glass fiber, can obtain excellent biosolubility and can achieve long fiber formation.

The glass composition for glass fiber of the present invention may include $TiO_2$ in the range of 0 to 0.4% by mass, with respect to the total amount, in a composition including $SiO_2$ in the range of 37.0 to 49.5% by mass, $B_2O_3$ in the range of 16.5 to 29.0% by mass, $Al_2O_3$ in the range of 15.0 to 28.0% by mass, CaO in the range of 10.5 to 21.0% by mass, and MgO in the range of 0 to 6.5% by mass, with respect to the total amount, from the view point of lowering the melt viscosity of molten glass to thereby facilitate long fiber formation. In contrast, in the above composition, when the content of $TiO_2$ exceeds 0.4% by mass with respect to the total amount, the biosolubility may decrease on formation of glass fiber.

In any of the above glass compositions for glass fiber of the present invention, the above S, B, A, C, and M preferably satisfy the following formula (4), more preferably satisfy the following formula (5), and particularly preferably satisfy the following formula (6).

$$13.6 \leq S \times (C+M)/(A+B) \leq 17.5 \tag{4}$$

$$16.2 \leq S \times (C+M)/(A+B) \leq 17.2 \tag{5}$$

$$16.6 \leq S \times (C+M)/(A+B) \leq 16.9 \tag{6}$$

Any of the above glass compositions for glass fiber of the present invention, when the S, B, A, C, and M satisfy the above formula (4), on formation of glass fiber, can have excellent biosolubility, is well-balanced in terms of the biosolubility, and facilitates long fiber formation. Any of the above glass compositions for glass fiber of the present invention, when the above S, B, A, C, and M satisfy the above formula (5), on formation of glass fiber, has more excellent biosolubility, is well-balanced in terms of the biosolubility, and facilitates long fiber formation. Further, any of the above glass compositions for glass fiber of the present invention, when the above S, B, A, C, and M satisfy the above formula (6), can more securely have more excellent biosolubility, is well-balanced in terms of the biosolubility, and facilitates long fiber formation.

The glass fiber of the present invention includes a glass filament formed of any of the above glass compositions for glass fiber. In the glass fiber of the present invention, the filament diameter of the glass filament is preferably less than 3.0 μm.

The glass fiber woven fabric of the present invention is formed of the above glass fiber.

The glass fiber-reinforced resin composition of the present invention includes the above glass fiber.

DESCRIPTION OF EMBODIMENTS

Hereinafter, embodiments of the present invention will be described in detail.

A glass composition for glass fiber of the present embodiment includes $SiO_2$ in the range of 35.0 to 55.0% by mass, $B_2O_3$ in the range of 10.0 to 30.0% by mass, $Al_2O_3$ in the range of 14.5 to 30.0% by mass, and CaO and MgO in the range of 8.7 to 25.0% by mass in total, with respect to the total amount, and the content S of $SiO_2$, the content B of $B_2O_3$, the content A of $Al_2O_3$, the content C of CaO, and the content M of MgO satisfy the following formula (1):

$$11.3 \leq S \times (C+M)/(A+B) \leq 20.7. \tag{1}$$

In the glass composition for glass fiber of the present embodiment, when the content of $SiO_2$ is less than 35.0% by mass with respect to the total amount, the strength and elastic modulus of the long glass fiber decrease, and thus, when the composition is used in a composite material with a resin, the effect of reinforcing the resin becomes insufficient. In contrast, the content of $SiO_2$ exceeds 55.0% by mass with respect to the total amount, the biosolubility may be lowered.

In the glass composition for glass fiber of the present embodiment, the content of $SiO_2$ with respect to the total amount is preferably in the range of 37.0 to 49.5% by mass, more preferably in the range of 37.5 to 48.5% by mass, still more preferably in the range of 38.0 to 47.5% by mass, particularly preferably in the range of 38.5 to 46.5% by mass, and most preferably in the range of 39.0 to 45.0% by mass.

In the glass composition for glass fiber of the present embodiment, when the content of $B_2O_3$ is less than 10.0% by mass with respect to the total amount, the devitrification temperature of the molten glass increases, thus long fiber formation may become difficult, and the biosolubility may decrease. In contrast, when the content of $B_2O_3$ exceeds 30.0% by mass with respect to the total amount, phase separation occurs in the molten glass, and thus long fiber formation becomes difficult.

In the glass composition for glass fiber of the present embodiment, the content of $B_2O_3$ with respect to the total amount is preferably in the range of 14.5 to 30.0% by mass, more preferably in the range of 15.5 to 29.5% by mass, still more preferably in the range of 16.5 to 29.0% by mass, especially preferably in the range of 16.7 to 25.5% by mass, particularly preferably in the range of 17.0 to 24.4% by mass, markedly preferably in the range of 17.2 to 22.0% by mass, and most preferably in the range of 17.5 to 20.5% by mass.

In the glass composition for glass fiber of the present embodiment, when the content of $Al_2O_3$ is less than 14.5% by mass with respect to the total amount, the strength and the elastic modulus of the long glass fiber decrease, and thus, when the composition is used in a composite material with a resin, the effect of reinforcing the resin becomes insufficient. In contrast, when the content of $Al_2O_3$ is more than 30.0% by mass with respect to the total amount, the devitrification temperature of the molten glass increases, and thus long fiber formation may become difficult.

In the glass composition for glass fiber of the present embodiment, the content of $Al_2O_3$ with respect to the total amount is preferably in the range of 15.0 to 28.0% by mass, more preferably in the range of 17.0 to 27.0% by mass, still more preferably in the range of 19.0 to 26.0% by mass, particularly preferably in the range of 21.0 to 25.5% by mass, and most preferably in the range of 23.0 to 25.0% by mass.

In the glass composition for glass fiber of the present invention, when the content of CaO and MgO in total is less than 8.7% by mass with respect to the total amount, the biosolubility of long glass fiber may decrease. In contrast, the content of CaO and MgO in total is more than 25.0% by mass with respect to the total amount, the devitrification temperature of the molten glass increases, and thus long fiber formation may become difficult.

In the glass composition for glass fiber of the present embodiment, the total content of CaO and MgO with respect to the total amount is preferably in the range of 9.0 to 23.0% by mass, more preferably in the range of 14.0 to 22.0% by mass, still more preferably in the range of 15.0 to 21.0% by mass, particularly preferably in the range of 16.0 to 20.0% by mass, and most preferably in the range of 17.0 to 19.5% by mass.

Here, the content of CaO with respect to the total amount of the glass composition for glass fiber of the present embodiment is, for example, in the range of 8.0 to 25.0% by mass, preferably in the range of 10.5 to 21.0% by mass, more preferably in the range of 13.0 to 20.5% by mass, still more preferably in the range of 14.5 to 20.0% by mass, particularly preferably in the range of 16.0 to 19.5% by mass, and most preferably in the range of 17.0 to 19.5% by mass.

Meanwhile, the content of MgO with respect to the total amount of the glass composition for glass fiber of the present embodiment is, for example, in the range of 0 to 10.0% by mass, preferably in the range of 0 to 6.5% by mass, more preferably in the range of 0 to 6.0% by mass, still more preferably in the range of 0 to 3.0% by mass, particularly preferably in the range of 0 to 1.0% by mass, and most preferably in the range of 0 to 0.9% by mass.

Assuming that the content of $SiO_2$ is S, the content of $B_2O_3$ is B, the content of $Al_2O_3$ is A, the content of CaO is C, and the content of MgO is M, with respect to the total amount, in the glass composition for glass fiber of the present embodiment, when the above S, B, A, C, and M satisfy the formula (1), on formation of glass fiber, biosolubility can be obtained, and long fiber formation can be achieved.

Here, the glass fiber having biosolubility means that the sum of the amount of $SiO_2$ eluted and the amount of $Al_2O_3$ eluted in an artificial lung fluid, as measured by a method described below, is 100.0 μg/h or more. Achieving long fiber formation with respect to glass fiber means that ΔT is −10° C. or more, wherein 1000 poise temperature and liquid phase temperature, as measured by methods described below, are used to define "working temperature range ΔT=1000 poise temperature–liquid phase temperature".

In the glass composition for glass fiber of the present embodiment, the above S, B, A, C, and M satisfy the following formula (2), preferably satisfy the following formula (2-1), more preferably satisfy the following formula (2-2), still more preferably satisfy the following formula (2-3), especially preferably satisfy the following formula (2-4), particularly preferably satisfy the following formula (2-5), markedly preferably satisfy the following formula (2-6), and most preferably satisfy the following formula (2-7).

$$12.5 \leq (A + 0.9 \times B)^3 \times (3 \times C + 2 \times M)/S^3 \leq 70.2 \tag{2}$$

$$15.0 \leq (A + 0.9 \times B)^3 \times (3 \times C + 2 \times M)/S^3 \leq 65.0 \tag{2-1}$$

$$17.5 \leq (A + 0.9 \times B)^3 \times (3 \times C + 2 \times M)/S^3 \leq 62.5 \tag{2-2}$$

$$20.0 \leq (A + 0.9 \times B)^3 \times (3 \times C + 2 \times M)/S^3 \leq 62.0 \tag{2-3}$$

$$25.0 \leq (A + 0.9 \times B)^3 \times (3 \times C + 2 \times M)/S^3 \leq 61.5 \tag{2-4}$$

$$30.0 \leq (A + 0.9 \times B)^3 \times (3 \times C + 2 \times M)/S^3 \leq 61.0 \tag{2-5}$$

$$40.0 \leq (A + 0.9 \times B)^3 \times (3 \times C + 2 \times M) \big/ S^3 \leq 60.5 \tag{2-6}$$

$$50.0 \leq (A + 0.9 \times B)^3 \times (3 \times C + 2 \times M)/S^3 \leq 60.0 \tag{2-7}$$

In the glass composition for glass fiber of the present embodiment, the above S, B, A, C, and M preferably satisfy the following formula (3):

$$11.3 \leq S \times (C + M)/(A + B) \leq 19.3. \tag{3}$$

The glass composition for glass fiber of the embodiment, when the above S, B, A, C, and M satisfy the above formula (3), on formation of glass fiber, can obtain excellent biosolubility and can achieve long fiber formation.

Here, the glass fiber having excellent biosolubility means that the sum of the amount of $SiO_2$ eluted and the amount of $Al_2O_3$ eluted in an artificial lung fluid, as measured by a method described below, is 105.0 μg/h or more.

The glass composition for glass fiber of the present embodiment may include $TiO_2$ in the range of 0 to 0.4% by mass, with respect to the total amount, in a composition including $SiO_2$ in the range of 37.0 to 49.5% by mass, $B_2O_3$ in the range of 16.5 to 29.0% by mass, $Al_2O_3$ in the range of 15.0 to 28.0% by mass, CaO in the range of 10.5 to 21.0% by mass, and MgO in the range of 0 to 6.5% by mass, with respect to the total amount, from the view point of lowering the melt viscosity of molten glass to thereby facilitate long fiber formation. In contrast, in the above composition, when the content of $TiO_2$ exceeds 0.4% by mass with respect to the total amount, on formation of glass fiber, the biosolubility may decrease.

When the glass composition for glass fiber of the present embodiment includes $TiO_2$, the content of $TiO_2$ is preferably in the range of 0 to 0.3% by mass, more preferably in the range of 0 to 0.2% by mass, still more preferably in the range of 0 to 0.1% by mass, particularly preferably in the range of 0 to 0.05% by mass, and most preferably in the range of 0 to 0.01% by mass, with respect to the total amount of the glass composition for glass fiber of the present embodiment.

In any of the above glass compositions for glass fiber of the present embodiment, the above S, B, A, C, and M preferably satisfy the following formula (4), more preferably satisfy the following formula (5), and particularly preferably satisfy the following formula (6).

$$13.6 \leq S \times (C + M)/(A + B) \leq 17.5 \tag{4}$$

$$16.2 \leq S \times (C + M)/(A + B) \leq 17.2 \tag{5}$$

$$16.6 \leq S \times (C + M)/(A + B) \leq 16.9 \tag{6}$$

Any of the above glass compositions for glass fiber of the present embodiment, when the S, B, A, C, and M satisfy the above formula (4), on formation of glass fiber, can have excellent biosolubility, is well-balanced in terms of the biosolubility, and facilitates long fiber formation. Any of the above glass compositions for glass fiber of the present embodiment, when the above S, B, A, C, and M satisfy the above formula (5), on formation of glass fiber, has more excellent biosolubility, is well-balanced in terms of the biosolubility, and facilitates long fiber formation. Further, any of the above glass compositions for glass fiber of the present embodiment, when the above S, B, A, C, and M satisfy the above formula (6), can more securely have more excellent biosolubility, is well-balanced in terms of the biosolubility, and facilitates long fiber formation.

Here, the glass fiber being well-balanced in terms of the biosolubility means that the ratio of the above amount of $Al_2O_3$ eluted to the above amount of $SiO_2$ in the above artificial lung fluid (amount of $Al_2O_3$ eluted/amount of $SiO_2$ eluted) is in the range of 0.7 to 1.3. Having more excellent biosolubility means that the sum of the above amount of $SiO_2$ and the above amount of $Al_2O_3$ eluted in the above artificial lung fluid is 120.0 μg/h or more. Facilitating long fiber formation with respect to the glass fiber means that the above working temperature range ΔT is 99° C. or more.

Further, in the glass composition for glass fiber of the present embodiment, the total content of $SiO_2$, $B_2O_3$, $Al_2O_3$, CaO, and MgO is, for example, 91.0% by mass or more, preferably 95.0% by mass or more, more preferably 98.0% by mass or more, still more preferably 99.0% by mass or more, especially preferably 99.3% by mass or more, particularly preferably 99.5% by mass or more, markedly preferably 99.7% by mass or more, and most preferably 99.9% by mass or more, with respect to the total amount.

The glass composition for glass fiber of the present embodiment may also include $Fe_2O_3$, from the viewpoint of improving the deaeration ability of the molten glass and improving stability of long fiber formation. The content of $Fe_2O_3$ is, for example, in the range of 0 to 0.4% by mass, preferably in the range of 0 to 0.3% by mass, more preferably in the range of 0 to 0.2% by mass, still more preferably in the range of 0 to 0.1% by mass, particularly preferably in the range of 0 to 0.05% by mass, and most preferably in the range of 0 to 0.01% by mass, with respect to the total amount of the glass composition for glass fiber of the present embodiment.

The glass composition for glass fiber of the present embodiment may also include $ZrO_2$, from the viewpoint of lowering the melt viscosity of the molten glass and facilitating long fiber formation. The content of $ZrO_2$ is, for example, in the range of 0 to 0.4% by mass, preferably in the range of 0 to 0.3% by mass, more preferably in the range of 0 to 0.2% by mass, still more preferably in the range of 0 to 0.1% by mass, particularly preferably in the range of 0 to 0.05% by mass, and most preferably in the range of 0 to 0.01% by mass, with respect to the total amount of the glass composition for glass fiber of the present embodiment.

The glass composition for glass fiber of the present embodiment may also include $Li_2O$, $K_2O$, and $Na_2O$, from the viewpoint of lowering the melt viscosity of the molten glass and facilitating long fiber formation. The total content of $Li_2O$, $K_2O$, and $Na_2O$ is, for example, in the range of 0 to 0.4% by mass, preferably in the range of 0 to 0.3% by mass, more preferably in the range of 0 to 0.2% by mass, still more preferably in the range of 0 to 0.1% by mass, particularly preferably in the range of 0 to 0.05% by mass, and most preferably in the range of 0 to 0.01% by mass, with respect to the total amount of the glass composition for glass fiber of the present embodiment.

The glass composition for glass fiber of the present embodiment may also include $F_2$ and $Cl_2$, from the viewpoint of improving the deaeration ability of the molten glass and improving stability of long fiber formation. The total content of $F_2$ and $Cl_2$ is, for example, in the range of 0 to 0.4% by mass, preferably in the range of 0 to 0.3% by mass, more preferably in the range of 0 to 0.2% by mass, still more preferably in the range of 0 to 0.1% by mass, particularly preferably in the range of 0 to 0.05% by mass, and most preferably in the range of 0 to 0.01% by mass, with respect to the total amount of the glass composition for glass fiber of the present embodiment.

The glass composition for glass fiber of the present embodiment may also include SrO, from the viewpoint of lowering the melt viscosity of the molten glass and facilitating long fiber formation. The content of SrO is, for example, in the range of 0 to 0.4% by mass, preferably in the range of 0 to 0.3% by mass, more preferably in the range of 0 to 0.2% by mass, still more preferably in the range of 0 to 0.1% by mass, particularly preferably in the range of 0 to 0.05% by mass, and most preferably in the range of 0 to 0.01% by mass, with respect to the total amount of the glass composition for glass fiber of the present embodiment.

The glass composition for glass fiber of the present embodiment may also include ZnO, from the viewpoint of suppressing increase in the devitrification temperature of the molten glass and facilitating long fiber formation. The content of ZnO is, for example, in the range of 0 to 0.4% by mass, preferably in the range of 0 to 0.3% by mass, more preferably in the range of 0 to 0.2% by mass, still more preferably in the range of 0 to 0.1% by mass, particularly preferably in the range of 0 to 0.05% by mass, and most preferably in the range of 0 to 0.01% by mass, with respect to the total amount of the glass composition for glass fiber of the present embodiment.

The glass composition for glass fiber of the present embodiment may also include $SnO_2$, from the viewpoint of suppressing increase in the devitrification temperature of the molten glass and facilitating long fiber formation. The content of $SnO_2$ is, for example, in the range of 0 to 0.4% by mass, preferably in the range of 0 to 0.3% by mass, more preferably in the range of 0 to 0.2% by mass, still more preferably in the range of 0 to 0.1% by mass, particularly preferably in the range of 0 to 0.05% by mass, and most preferably in the range of 0 to 0.01% by mass, with respect to the total amount of the glass composition for glass fiber of the present embodiment.

The glass composition for glass fiber of the present embodiment may also include $P_2O_5$, from the viewpoint of suppressing increase in the devitrification temperature of the molten glass and facilitating long fiber formation. From the viewpoint of suppressing generation of bubbles in the molten glass, the content of $P_2O_5$ is, for example, preferably in the range of less than 2.5% by mass with respect to the total amount of the glass composition for glass fiber of the present embodiment. The content of $P_2O_5$ is, for example, preferably in the range of less than 2.5% by mass, more preferably in the range of less than 2.0% by mass, still more preferably in the range of less than 1.5% by mass, especially preferably in the range of less than 1.0% by mass, particularly preferably in the range of less than 0.8% by mass, markedly preferably in the range of less than 0.6% by mass, and most preferably in the range of less than 0.5% by mass, with respect to the total amount of the glass composition for glass fiber of the present embodiment.

The glass composition for glass fiber of the present embodiment may include, as impurities attributable to raw materials, less than 1.00% by mass of oxides of Ba, Mn, Co, Ni, Cu, Cr, Mo, W, Ce, Y, La, Bi, Gd, Pr, Sc, or Yb in total with respect to the total amount of the glass composition for glass fiber. Particularly when the glass composition for glass fiber of the present embodiment includes BaO, $CeO_2$, $Y_2O_3$, $La_2O_3$, $Bi_2O_3$, $Gd_2O_3$, $Pr_2O_3$, $Sc_2O_3$, or $Yb_2O_3$ as impurities, the content of each of the impurities is independently preferably less than 0.40% by mass, more preferably less than 0.20% by mass, still more preferably less than 0.10% by mass, particularly preferably less than 0.05% by mass, and most preferably less than 0.01% by mass.

Regarding measurement of the content of each component described above in the glass composition for glass fiber of the present embodiment, the content of Li as the light element can be measured with an ICP emission spectroscopic analyzer, and the contents of the other elements can be measured with a wavelength dispersive X-ray fluorescence analyzer.

The measurement method is as follows. First, a glass batch prepared by mixing a glass raw material, or glass fiber is placed in a platinum crucible, and melted with stirring while being held at a temperature of 1500° C. for the glass batch and at a temperature of 1450° C. for the glass fiber for 6 hours in an electric furnace to obtain a homogeneous molten glass. When organic matter adheres to the surface of the glass fiber, or when glass fiber is mainly included as a reinforcing material in organic matter such as resin, the glass fiber is used after the organic matter is removed by, for example, heating for about 0.5 to 24 hours in a muffle furnace at 300 to 650° C. Next, the obtained molten glass is poured onto a carbon plate to produce a glass cullet, and then pulverized and powdered into glass powder. Regarding Li as a light element, the glass powder is thermally decomposed with an acid and then quantitatively analyzed using an ICP emission spectroscopic analyzer. Regarding other elements, the glass powder is molded into a disc shape by a pressing machine and then quantitatively analyzed using a wavelength dispersive X-ray fluorescence analyzer. These quantitative analysis results are converted in terms of oxides to calculate the content of each component and the total amount, and the above content of each component can be determined from these numerical values (% by mass).

Then, the glass fiber of the present embodiment includes a glass filament formed of the above glass composition for glass fiber of the present embodiment.

The glass fiber of the present embodiment is manufactured as follows. First, a glass raw material (glass batch) prepared to have the composition of the glass composition for glass fiber of the present embodiment, based on the content of components included in ores to be the glass raw material and each component and the amount of each component volatilized in the melting process, is supplied to a melting furnace and melted at a temperature in the range of 1450 to 1550° C., for example. Then, the molten glass batch (molten glass) is drawn from 1 to 20000 nozzle tips of a bushing controlled at a predetermined temperature and rapidly cooled to form glass filaments.

When the glass composition for glass fiber of the present embodiment is melted at a temperature within the above range for manufacturing the above glass fiber, 1000 poise temperature and liquid phase temperature are used to define "working temperature range $\Delta T=1000$ poise temperature–liquid phase temperature". When $\Delta T$ is $-10°$ C. or more, long fiber formation can be achieved, and when $\Delta T$ is 99° C. or more, long fiber formation is facilitated.

Glass single fiber (glass filament) discharged from one nozzle tip or hole, cooled and solidified typically has a perfect circle cross-sectional shape and preferably has a diameter (filament diameter) of less than 3.0 μm. On the other hand, when the above nozzle tip has a non-circular shape and has a protrusion or a notch for rapidly cooling the molten glass, controlling the temperature condition can provide a glass filament having a non-circular, such as elliptical or long-oval, cross-sectional shape. When the glass filament has an elliptical or long-oval cross-sectional shape, the converted fiber diameter, which is a fiber diameter when the cross-sectional area is converted to a perfect circle, is preferably less than 3.0 μm. The lower limit value of the above filament diameter is, for example, 0.5 μm, preferably 1.0 μm, and more preferably 2.0 μm.

The filament diameter of the above glass filament can be calculated as follows, for example. First, the glass fiber is embedded in a resin such as an epoxy resin, and the resin is cured. The cured resin is cut, and the cross section is polished. Then, the cross section of the cured resin is observed using an electron microscope, and the diameter of 50 or more glass filaments exposed at the above cross section is measured in the case of the glass filaments each having a perfect-circular or substantially perfect-circular cross-sectional shape. In the case of the cross-sectional shape of the glass filaments being other than perfect-circular or substantially perfect-circular, the cross-sectional area is calculated, and the converted fiber diameter is calculated based on the cross-sectional area. Then, the filament diameter of the above glass filaments is calculated by determining the average value of the measured or calculated diameters or converted fiber diameters. The filament diameter of the above glass filament also can be measured by image-processing images obtained with an electron microscope by an automatic analyzer.

Meanwhile, when the glass fiber of the present embodiment is a glass fiber-reinforced resin molded article, the filament diameter of the above glass filaments can be measured as follows, for example. First, the glass fiber-reinforced resin molded article is heated at 625° C. for 30 minutes to burn the thermoplastic resin off, and the glass fiber is taken out. Then, the filament diameter of the above glass filaments is measured in the same manner as in the method for measuring the filament diameter of the above glass filaments in the glass fiber described above.

Subsequently, the glass filaments formed are applied with a sizing agent or binder using an applicator as an application apparatus. While 1 to 20000 of the glass filaments are bundled using a bundling shoe, the glass filaments are wound on a tube at a high speed using a winding apparatus to obtain glass fiber.

The glass fiber of the present embodiment may be coated with an organic matter on the surface thereof for the purposes such as improvement of glass filament convergence, improvement of adhesiveness between glass fiber and a resin, and improvement of uniform dispersibility of glass fiber in a mixture of glass fiber and resin or inorganic material. Examples of such an organic matter can include starch, urethane resins, epoxy resins, vinyl acetate resins, acrylic resins, modified polypropylene, particularly carboxylic acid-modified polypropylene, and a copolymer of (poly) carboxylic acid, particularly maleic acid, and an unsaturated monomer. The glass fiber of the present embodiment may be coated with the resin composition including a silane coupling agent, a lubricant, surfactant, and the like in addition to these resins. The glass fiber of the present embodiment may be coated with the treating agent composition not including the above resins and including a silane coupling agent, surfactant, and the like. Such a resin composition or treating agent composition covers the glass fiber at a rate of 0.03 to 2.0% by mass based on the mass of the glass fiber of the present embodiment in a state where it is not coated with the resin composition or the treating agent composition. The glass fiber can be coated with an organic matter by applying a resin solution or a resin composition solution to the glass fiber using a known method such as a roller applicator, for example, in the manufacturing process of the glass fiber and then drying the glass fiber to which the resin solution or the resin composition solution is applied. The glass fiber can be coated with an organic matter by immersing the glass fiber of the present embodiment in the form of a woven fabric in the treating agent composition solution and then drying the glass fiber to which the treating agent composition is applied.

Here, examples of the silane coupling agent include aminosilanes, ureidosilanes, chlorosilanes, epoxysilanes, mercaptosilanes, vinylsilanes, (meth)acrylsilanes, phenylsilanes, styrylsilanes, and isocyanate silanes. In the present embodiment, the silane coupling agents may be used singly or in combination of two or more.

Examples of the aminosilane include γ-aminopropyltriethoxysilane, N-β-(aminoethyl)-γ-aminopropyltrimethoxysilane, N-β-(aminoethyl)-N'-β-(aminoethyl)-γ-aminopropyltrimethoxysilane, and γ-anilinopropyltrimethoxysilane.

Examples of the ureidosilane include γ-ureidopropyltriethoxysilane.

Examples of the chlorosilane include γ-chloropropyltrimethoxysilane.

Examples of the epoxysilane include β-(3,4-epoxycyclohexyl)ethyltrimethoxysilane and γ-glycidoxypropyltrimethoxysilane.

Examples of the mercaptosilane include γ-mercaptotrimethoxysilane and γ-mercaptopropyltrimethoxysilane.

Examples of the vinylsilane include vinyltrimethoxysilane, N-β-(N-vinylbenzylaminoethyl)-γ-aminopropyltrimethoxysilane, and N-benzyl-β-aminoethyl-γ-aminopropyltrimethoxysilane.

Examples of the (meth)acrylsilane include γ-acryloxypropyltrimethoxysilane and γ-methacryloxypropyltrimethoxysilane.

Examples of the phenylsilane include phenyltrimethoxysilane.

Examples of the styrylsilane include p-styryltrimethoxysilane.

Examples of the isocyanate silane include γ-isocyanate propyltriethoxysilane.

Examples of the lubricant include modified silicone oils, animal oils and hydrogenated products thereof, vegetable oils and hydrogenated products thereof, animal waxes, vegetable waxes, mineral waxes, condensates of a higher saturated fatty acid and a higher saturated alcohol, polyethyleneimine, polyalkylpolyamine alkylamide derivatives, fatty acid amides, and quaternary ammonium salts. In the present embodiment, the lubricants may be used singly or in combination of two or more.

Examples of the animal oil include beef tallow.

Examples of the vegetable oil include soybean oil, coconut oil, rapeseed oil, palm oil, and castor oil.

Examples of the animal wax include beeswax and lanolin.

Examples of the vegetable wax include candelilla wax and carnauba wax.

Examples of the mineral wax include paraffin wax and montan wax.

Examples of the condensate of a higher saturated fatty acid and a higher saturated alcohol include stearates such as lauryl stearate.

Examples of the fatty acid amide include dehydrated condensates of polyethylenepolyamines such as diethylenetriamine, triethylenetetramine, and tetraethylenepentamine and fatty acids such as lauric acid, myristic acid, palmitic acid, and stearic acid.

Examples of the quaternary ammonium salt include alkyltrimethylammonium salts such as lauryltrimethylammonium chloride.

Examples of the surfactant include nonionic surfactants, cationic surfactants, anionic surfactants, and amphoteric surfactants. In the present embodiment, the surfactants may be used singly or in combination of two or more.

Examples of the nonionic surfactant include ethylene oxide propylene oxide alkyl ether, polyoxyethylene alkyl ether, polyoxyethylene-polyoxypropylene-block copolymer, alkyl polyoxyethylene-polyoxypropylene block copolymer ether, polyoxyethylene fatty acid ester, polyoxyethylene fatty acid monoester, polyoxyethylene fatty acid diester, polyoxyethylene sorbitan fatty acid ester, glycerol fatty acid ester ethylene oxide adduct, polyoxyethylene castor oil ether, hydrogenated castor oil ethylene oxide adduct, alkylamine ethylene oxide adduct, fatty acid amide ethylene oxide adduct, glycerol fatty acid ester, polyglycerol fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, ethylene oxide adduct of acetylene glycol, and ethylene oxide adduct of acetylene alcohol.

Examples of the cationic surfactant include alkyldimethylbenzylammonium chloride, alkyltrimethylammonium chloride, alkyl dimethyl ethyl ammonium ethyl sulfate, higher alkylamine salts (such as acetate and hydrochloride), adduct of ethylene oxide to a higher alkylamine, condensate of a higher fatty acid and polyalkylene polyamine, a salt of an ester of a higher fatty acid and alkanolamine, a salt of higher fatty acid amide, imidazoline cationic surfactant, and alkyl pyridinium salt.

Examples of the anionic surfactant include higher alcohol sulfate salts, higher alkyl ether sulfate salts, α-olefin sulfate salts, alkylbenzene sulfonate salts, α-olefin sulfonate salts, reaction products of fatty acid halide and N-methyl taurine, dialkyl sulfosuccinate salts, higher alcohol phosphate ester salts, and phosphate ester salts of higher alcohol ethylene oxide adduct.

Examples of the amphoteric surfactant include amino acid amphoteric surfactants such as alkali metal salts of alkylaminopropionic acid, betaine amphoteric surfactants such as alkyldimethylbetaine, and imidazoline amphoteric surfactants.

Examples of the form of the glass fiber include woven fabrics (glass cloths), knitted fabrics, yarns, chopped strands, rovings, chopped strand mats, paper, mesh, braided fabrics, and milled fiber, and woven fabrics (glass cloths) are preferred.

Next, the glass fiber woven fabric of the present embodiment is formed of the above glass fiber of the present embodiment. The glass fiber woven fabric of the present embodiment can be obtained by weaving the above glass fiber as warp yarns and weft yarns using a loom known per se. Examples of the loom may include jet looms such as air jet or water jet looms, shuttle looms, and rapier looms. Examples of weaving with the loom may include plain weaving, satin weaving, mat weaving, and twill weaving. From the viewpoint of production efficiency, plain weaving is preferred.

The above glass fiber of the present embodiment included in the glass fiber woven fabric of the present embodiment is preferably formed of glass filaments comprising a filament diameter of 2.0 μm or more and 9.0 μm or less and comprises a mass of 0.5 to 70.0 tex (g/1000 m) and is more preferably formed of glass filaments comprising a filament diameter of 2.0 μm or more and less than 3.0 μm and comprises a mass of 0.5 to 1.5 tex.

Here, the filament diameter of the above glass fiber of the present embodiment included in the glass fiber woven fabric of the present embodiment is the average value of measurements when the diameter of the glass filaments constituting the above glass fiber is measured on at least 50 cross sections of the above glass fiber with a scanning electron microscope (manufactured by Hitachi High-Tech Corporation, trade name: S-3400N, magnification: 3000 times).

The glass fiber woven fabric of the present embodiment is preferably constituted by warp yarns comprising a weaving density of 40 to 150 yarns/25 mm and weft yarns comprising a weaving density of 40 to 150 yarns/25 mm.

The weaving density of the above warp yarns can be determined by counting the number of the warp yarns within a 25-mm range in the warp direction in accordance with JIS R3420 using a textile magnification glass. The weaving density of the above weft yarns can be determined by counting the number of the weft yarns within a 25-mm range in the weft direction in accordance with JIS R3420 using a textile magnification glass.

The glass fiber woven fabric of the present embodiment, after woven, may be subjected to desizing treatment, surface treatment, and opening treatment.

An example of the desizing treatment is a treatment including placing the glass fiber woven fabric in a heating oven having an atmosphere temperature of 350° C. to 400°

C. for 40 to 80 hours to thereby pyrolytically decompose organic matter adhering to the glass fiber.

An example of the surface treatment is a treatment including immersing the glass fiber woven fabric in a solution including the silane coupling agent or including the silane coupling agent and the surfactant, squeezing extra water therefrom, and heat-drying the woven fabric in a temperature range of 80 to 180° C. for 1 to 30 minutes.

An example of the opening treatment is a treatment in which the warp yarns of the glass fiber woven fabric are subjected to opening by means of water flow pressure, opening by means of high-frequency vibration using a liquid as a medium, opening by means of the pressure of a fluid having a surface pressure, opening by means of pressing with a roll, or the like under a tension of 20 to 200 N to thereby widen the width of the warp yarns and weft yarns.

The glass fiber woven fabric of the present embodiment has a mass in the range of 5.0 to 220 g/m² and preferably a thickness in the range of 4.0 to 200.0 μm.

The glass fiber woven fabric of the present embodiment may comprise a surface treatment layer including the silane coupling agent or the silane coupling agent and the surfactant. When the glass fiber woven fabric of the present embodiment includes the surface treatment layer, the surface treatment layer can have a mass in the range of 0.03 to 1.50% by mass, for example, with respect to the total amount of the glass fiber woven fabric including the surface treatment layer.

The glass fiber-reinforced resin composition of the present embodiment includes the above glass fiber of the present embodiment. Specifically, the glass fiber-reinforced resin composition of the present embodiment includes 10 to 90% by mass of glass fiber with respect to the total amount of the glass fiber-reinforced resin composition, as the glass fiber-reinforced resin composition including resin (thermoplastic resin or thermosetting resin), glass fiber, and other additives. The glass fiber-reinforced resin composition of the present embodiment includes 90 to 10% by mass of a resin and includes other additives in the range of 0 to 40% by mass with respect to the total amount of the glass fiber-reinforced resin composition.

Examples of the above thermoplastic resin can include polyethylene, polypropylene, polystyrene, styrene/maleic anhydride resins, styrene/maleimide resins, polyacrylonitrile, acrylonitrile/styrene (AS) resins, acrylonitrile/butadiene/styrene (ABS) resins, chlorinated polyethylene/acrylonitrile/styrene (ACS) resins, acrylonitrile/ethylene/styrene (AES) resins, acrylonitrile/styrene/methyl acrylate (ASA) resins, styrene/acrylonitrile (SAN) resins, methacrylic resins, polyvinyl chloride (PVC), polyvinylidene chloride (PVDC), polyamide, polyacetal, polyethylene terephthalate (PET), polybutylene terephthalate (PBT), polytrimethylene terephthalate (PTT), polycarbonate, polyarylene sulfide, polyethersulfone (PES), polyphenylsulfone (PPSU), polyphenylene ether (PPE), modified polyphenylene ether (m-PPE), polyaryl etherketone, liquid crystal polymer (LCP), fluororesins, polyetherimide (PEI), polyarylate (PAR), polysulfone (PSF), polyamideimide (PAI), polyaminobismaleimide (PABM), thermoplastic polyimide (TPI), polyethylene naphthalate (PEN), ethylene/vinyl acetate (EVA) resins, ionomer (IO) resins, polybutadiene, styrene/butadiene resins, polybutylene, polymethylpentene, olefin/vinyl alcohol resins, cyclic olefin resins, cellulose resins, and polylactic acid.

Specific examples of the polyethylene include high density polyethylene (HDPE), medium density polyethylene, low density polyethylene (LDPE), linear low density polyethylene (LLDPE), and ultra high molecular weight polyethylene.

Examples of the polypropylene include isotactic polypropylene, atactic polypropylene, syndiotactic polypropylene, and mixtures thereof.

Examples of the polystyrene include general-purpose polystyrene (GPPS), which is an atactic polystyrene having an atactic structure, high impact polystyrene (HIPS) with a rubber component added to GPPS, and syndiotactic polystyrene with syndiotactic structure.

Examples of the methacrylic resin include polymers obtained by homopolymerizing one of acrylic acid, methacrylic acid, styrene, methyl acrylate, ethyl acrylate, ethyl methacrylate, butyl acrylate, butyl methacrylate, and fatty acid vinyl ester, or polymers obtained by copolymerizing two or more of these.

Examples of the polyvinyl chloride include a vinyl chloride homopolymer, a copolymer of a vinyl chloride monomer and a copolymerizable monomer, or a graft copolymer obtained by graft polymerization of a vinyl chloride monomer to polymer polymerized by a conventionally known method such as emulsion polymerization method, suspension polymerization method, micro suspension polymerization method, or bulk polymerization method.

Examples of the polyamide can include one of components such as polycaproamide (nylon 6), polyhexamethylene adipamide (nylon 66), polytetramethylene adipamide (nylon 46), polytetramethylene sebacamide (nylon 410), polypentamethylene adipamide (nylon 56), polypentamethylene sebacamide (nylon 510), polyhexamethylene sebacamide (nylon 610), polyhexamethylene dodecamide (nylon 612), polydecamethylene adipamide (nylon 106), polydecamethylene sebacamide (nylon 1010), polydecamethylene dodecamide (Nylon 1012), polyundecanamide (Nylon 11), polyundecamethylene adipamide (Nylon 116), polydodecanamide (Nylon 12), polyxylene adipamide (nylon XD6), polyxylene sebacamide (nylon XD10), polymetaxylylene adipamide (nylon MXD6), polyparaxylylene adipamide (nylon PXD6), polytetramethylene terephthalamide (nylon 4T), polypentamethylene terephthalamide (nylon 5T), polyhexamethylene terephthalamide (nylon 6T), polyhexamethylene isophthalamide (nylon 6I), polynonamethylene terephthalamide (nylon 9T), polydecamethylene terephthalamide (nylon 10T), polyundecamethylene terephthalamide (nylon 11T), polydodecamethylene terephthalamide (nylon 12T), polytetramethylene isophthalamide (nylon 4I), polybis(3-methyl-4-aminohexyl) methane terephthalamide (nylon PACMT), polybis(3-methyl-4-aminohexyl) methane isophthalamide (nylon PACMI), polybis(3-methyl-4-aminohexyl) methane dodecamide (nylon PACM12), and polybis(3-methyl-4-aminohexyl) methane tetradecamide (nylon PACM14) or copolymers or mixtures of two or more of the components.

Examples of the polyacetal include a homopolymer with oxymethylene units as the main repeating unit, and a copolymer mainly consisting of oxymethylene units and containing oxyalkylene units having 2 to 8 adjacent carbon atoms in the main chain.

Examples of the polyethylene terephthalate include a polymer obtained by polycondensation of terephthalic acid or a derivative thereof with ethylene glycol.

Examples of the polybutylene terephthalate include a polymer obtained by polycondensation of terephthalic acid or a derivative thereof with 1,4-butanediol.

Examples of the polytrimethylene terephthalate include polymers obtained by polycondensation of terephthalic acid or a derivative thereof with 1,3-propanediol.

Examples of the polycarbonate include polymers obtained by a transesterification method in which a dihydroxydiaryl compound is reacted with a carbonate such as diphenyl carbonate in a molten state; or polymers obtained by phosgene method in which a dihydroxyaryl compound is reacted with phosgene.

Examples of the polyarylene sulfide include linear polyphenylene sulfide, cross linked polyphenylene sulfide having a high molecular weight obtained by performing a curing reaction after polymerization, polyphenylene sulfide sulfone, polyphenylene sulfide ether, and polyphenylene sulfide ketone.

Examples of the polyphenylene ether include poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly[2-(4'-methylphenyl)-1,4-phenylene ether], poly(2-bromo-6-phenyl-1,4-phenylene ether), poly(2-methyl-6-phenyl-1,4-phenylene ether), poly(2-phenyl-1,4-phenylene ether), poly(2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether), and poly(2,6-dimethyl-1,4-phenylene ether).

Examples of the modified polyphenylene ether include: a polymer alloy of poly(2,6-dimethyl-1,4-phenylene)ether and polystyrene; a polymer alloy of poly(2,6-dimethyl-1,4-phenylene)ether and a styrene/butadiene copolymer; a polymer alloy of poly(2,6-dimethyl-1,4-phenylene)ether and a styrene/maleic anhydride copolymer; a polymer alloy of poly(2,6-dimethyl-1,4-phenylene)ether and polyamide; a polymer alloy of poly(2,6-dimethyl-1,4-phenylene)ether and styrene/butadiene/acrylonitrile copolymer; one obtained by introducing a functional group such as an amino group, an epoxy group, a carboxy group, a styryl group, or the like at the polymer chain end of the polyphenylene ether; and one obtained by introducing a functional group such as an amino group, an epoxy group, a carboxy group, a styryl group, a methacryl group, or the like at the polymer chain side chain of the polyphenylene ether.

Examples of the polyaryl etherketone include polyetherketone (PEK), polyetheretherketone (PEEK), polyetherketoneketone (PEKK), and polyetheretherketoneketone (PEEKK).

Examples of the liquid crystal polymer (LCP) include a polymer (copolymer) consisting of one or more structural units selected from aromatic hydroxycarbonyl units which are thermotropic liquid crystal polyesters, aromatic dihydroxy units, aromatic dicarbonyl units, aliphatic dihydroxy units, aliphatic dicarbonyl units, and the like.

Examples of the fluororesin include polytetrafluoroethylene (PTFE), perfluoroalkoxy resins (PFA), fluorinated ethylene propylene resins (FEP), fluorinated ethylene tetrafluoroethylene resins (ETFE), polyvinyl fluoride (PVF), polyvinylidene fluoride (PVDF), polychlorotrifluoroethylene (PCTFE), and ethylene/chlorotrifluoroethylene resin (ECTFE).

Examples of the ionomer (IO) resin include copolymers of an olefin or a styrene and an unsaturated carboxylic acid, wherein a part of carboxyl groups is neutralized with a metal ion.

Examples of the olefin/vinyl alcohol resin include ethylene/vinyl alcohol copolymers, propylene/vinyl alcohol copolymers, saponified products of ethylene/vinyl acetate copolymers, and saponified products of propylene/vinyl acetate copolymers.

Examples of the cyclic olefin resin include monocyclic compounds such as cyclohexene, polycyclic compounds such as tetracyclopentadiene, and polymers of cyclic olefin monomers.

Examples of the polylactic acid include poly-L-lactic acid which is a homopolymer of L-form, poly-D-lactic acid which is a homopolymer of D-form, or a stereocomplex polylactic acid which is a mixture thereof.

Examples of the cellulose resin can include methylcellulose, ethyl cellulose, hydroxycellulose, hydroxymethylcellulose, hydroxyethyl cellulose, hydroxyethyl methylcellulose, hydroxypropylmethylcellulose, cellulose acetate, cellulose propionate, and cellulose butyrate.

Examples of the above thermosetting resin can include unsaturated polyester resins, vinyl ester resins, epoxy (EP) resins, melamine (MF) resins, phenol resins (PF), urethane resins (PU), polyisocyanate, polyisocyanurate, modified polyimide (PI) resin, urea (UF) resins, silicone (SI) resins, furan (FR) resins, benzoguanamine (BR) resins, alkyd resins, xylene resins, bismaleimide triazine (BT) resins, and diallyl phthalate resin (PDAP).

Specific examples of the unsaturated polyester resin include resin obtained by esterification reaction of aliphatic unsaturated dicarboxylic acid and aliphatic diol.

Examples of the vinyl ester resin include bis vinyl ester resins and novolac vinyl ester resins.

Examples of the epoxy resin include bisphenol A epoxy resins, bisphenol F epoxy resins, bisphenol E epoxy resins, bisphenol S epoxy resins, bisphenol M epoxy resins (4,4'-(1,3-phenylenediisopropylidene)bisphenol epoxy resins), bisphenol P epoxy resins (4,4'-(1,4-phenylenediisopropylidene)bisphenol epoxy resins), bisphenol Z epoxy resins (4,4'-cyclohexylidne bisphenol epoxy resins), phenol novolac epoxy resins, cresol novolac epoxy resins, tetraphenol group ethane novolac type epoxy resins, novolac epoxy resins having a condensed ring aromatic hydrocarbon structure, biphenyl epoxy resins, aralkyl epoxy resins such as xylylene epoxy resins and phenyl aralkyl epoxy resins, naphthylene ether epoxy resins, naphthol epoxy resins, naphthalene diol epoxy resins, bifunctional or tetrafunctional epoxy naphthalene resins, binaphthyl epoxy resins, naphthalene aralkyl epoxy resins, anthracene epoxy resins, phenoxy epoxy resins, dicyclopentadiene epoxy resins, norbornene epoxy resins, adamantane epoxy resins, and fluorene epoxy resins.

Examples of the melamine resin include a polymer formed by polycondensation of melamine (2,4,6-triamino-1,3,5-triazine) and formaldehyde.

Examples of the phenolic resin include novolac phenolic resins such as phenol novolac resins, cresol novolac resins, and bisphenol A novolac resins, resol phenol resins such as methylol resole resins and dimethylene ether resole resins, or aryl alkylene phenol resins, and include one of these or combinations of two or more.

Examples of the urea resin include a resin obtained by condensation of urea and formaldehyde.

The above thermoplastic resin or the above thermosetting resin may be used singly or in combinations of two or more.

Examples of the above other additives can include reinforcing fiber other than glass fiber such as carbon fiber and metal fiber, a filler other than glass fiber such as glass powder, talc, and mica, a flame retardant, an UV absorber, a heat stabilizer, an antioxidant, an antistatic agent, a fluidity improver, an anti-blocking agent, a lubricant, a nucleating agent, an antibacterial agent, and pigment.

The glass fiber-reinforced resin composition of the present embodiment may be prepreg obtained by impregnating the glass fiber woven fabric of the present embodiment with the resin by a known method per se and semi-curing the woven fabric.

The glass fiber-reinforced resin composition of the present embodiment can be molded by a known molding method to obtain various glass fiber-reinforced resin molded articles. Examples of the known molding method include injection molding method, injection compression molding method, two-color molding method, hollow molding method, foam molding method also including supercritical fluid, insert molding method, in-mold coating molding method, autoclave molding method, extrusion molding method, sheet molding method, thermal molding method, rotational molding method, laminate molding method, press molding method, blow molding method, stamping molding method, infusion method, hand lay-up method, spray-up method, low-pressure RIM molding method, resin transfer molding method, sheet molding compound method, bulk molding compound method, pultrusion method, and filament winding method. Curing the prepreg can also provide glass fiber-reinforced resin molded products.

Examples of applications of the molded article include electronic components such as printed wiring boards and connectors, housings of electronic devices such antennas and radar, and separators of fuel cells.

Examples and Comparative Examples of the present invention will be shown.

EXAMPLES

Examples 1 to 7, Comparative Examples 1 to 3

At first, glass raw material was mixed to obtain a glass batch so that the glass composition after melt-solidification is the composition of Examples 1 to 7 or Comparative Examples 1 to 3 shown in Tables 2 to 4. Next, the obtained glass batch was placed in a platinum crucible. While this platinum crucible was held in an electric furnace for 4 hours under temperature conditions in the range of 1400 to 1550° C. appropriate for melting of the glass batch of each of Examples and Comparative Examples, the glass batch was melted with stirring to obtain a homogeneous molten glass. Next, the obtained molten glass is poured onto a carbon plate and cooled to obtain bulk glass cullet.

Next, the obtained glass cullet was used to evaluate the biosolubility and the long fiber forming ability by methods shown below.
[Biosolubility]

First, in accordance with K. Sebastian. et al., Glass Science and Technology, Vol. 75, pp. 263-270 (2020), an artificial lung fluid of pH 4.5, which comprises the composition shown in Table 1 and simulates the environment in the lungs, was prepared by sequentially adding Nos. 1 to 12 reagents shown in Table 1 to about 800 mL of distilled water such that the final volume of 1 L was achieved while the pH was adjusted with No. 13 hydrochloric acid so as to reach a pH of 4.5. Then, the prepared artificial lung fluid was allowed to stand for 24 hours. Then, in the artificial lung fluid after the standing, the pH had increased in association with release of carbonic gas, and thus the pH of the artificial lung fluid was adjusted to 4.5 again using hydrochloric acid.

Fiber taken in the lungs is known to be taken up by macrophages. As the pH around macrophages is 4.5, fiber having high solubility in the artificial lung fluid of pH 4.5 is expected to be dissolved inside the lungs.

TABLE 1

| No. | Compositional component of artificial lung fluid | Content (g/L) |
|---|---|---|
| 1 | Sodium chloride | 7.12 |
| 2 | Sodium hydrogen carbonate | 1.95 |
| 3 | Calcium chloride | 0.022 |
| 4 | Disodium hydrogen phosphate | 0.148 |
| 5 | Sodium sulfate | 0.079 |
| 6 | Magnesium chloride hexahydrate | 0.212 |
| 7 | Glycine | 0.118 |
| 8 | Trisodium citrate dihydrate | 0.152 |
| 9 | Sodium tartrate dihydrate | 0.18 |
| 10 | Sodium pyruvate | 0.172 |
| 11 | 90% Lactic acid | 0.156 |
| 12 | Formaldehyde | 3 mL |
| 13 | Hydrochloric acid (1:1) | 4-5 mL |

Next, the glass cullet described above was coarsely pulverized to obtain glass particles having a particle diameter of 0.5 to 1.5 mm. Then, the obtained glass particles were finely pulverized with an automatic mortar and a ball mill-type pulverizer, and particles that had passed through a sieve having a nominal mesh opening of 38 μm in accordance with JIS Z8801-1 were used as a test glass powder sample.

Next, in accordance with K. Sebastian. et al., Glass Science and Technology, Vol. 75, pp. 263-270 (2020), an elution test was performed in such a manner that the test glass powder sample was packed into a silicone tube having syringe filters attached at the top and bottom, the above artificial lung fluid warmed to 37° C. was pumped into the silicone tube at a flow rate of 140 to 170 mL/day, and the filtrate that passed through the test glass powder sample and the filters was stored in a container. At this time, the mass of the test glass powder sample packed in the silicone tube was adjusted such that the ratio of the flow rate of the artificial lung fluid (unit: $\mu m^3$/s) to the sample surface area (unit: $\mu m^2$) (flow rate of the artificial lung fluid/sample surface area) was 0.030±0.005 μm/s. After the elapse of 24 hours, the filtrate was recovered from the container, Si and Al were taken as ions to be analyzed, ion components eluted in the filtrate were quantified using inductively coupled plasma mass spectrometry (ICP-MS), and the ICP-MS quantitative results of Si and Al (μg) were divided by 24 hours to calculate the elution rate (g/h) of each component. The results of Examples 1 to 4 are shown in Table 2, the results of Examples 5 to 7 are shown in Table 3, and the results of Comparative Examples 1 to 3 are shown in Table 4.
[Long Fiber Forming Ability]

By use of a high temperature electric furnace equipped with a rotational viscometer (manufactured by Shibaura System Co. Ltd.), the glass cullet described above was melted in a platinum crucible, and the viscosity of the molten glass was continuously measured using the Brookfield rotational viscometer with the melt temperature varied. The temperature at which the rotational viscosity was 1000 poise was measured to determine the 1000 poise temperature.

Next, 40 g of the glass particles having a particle diameter of 0.5 to 1.5 mm, obtained by pulverizing the glass cullet described above, were placed in a platinum boat of 180×

20×15 mm and heated in a tubular electric furnace provided with a temperature gradient of 900 to 1300° C. for 8 hours or more, then taken out of the tubular electric furnace, and observed with a polarized light microscope to identify the position at which crystals derived from devitrified glass began to precipitate. The temperature inside the tubular electric furnace was measured using a type B thermocouple to determine the temperature of the position at which the precipitation began, which temperature was taken as the liquid phase temperature.

Next, the working temperature range ΔT (ΔT=1000 poise temperature–liquid phase temperature) was calculated from the 1000 poise temperature and the liquid phase temperature measured by the above methods. The long fiber forming ability was evaluated as "A" when ΔT was +99° C. or more, the long fiber forming ability was evaluated as "B" when ΔT was –10° C. or more and less than +99° C., and the long fiber forming ability was evaluated as "C" when ΔT was less than –10° C. The results of Examples 1 to 4 are shown in Table 2, the results of Examples 5 to 7 are shown in Table 3, and the results of Comparative Examples 1 to 3 are shown in Table 4.

Example 8

In the present Example, first, the glass cullet obtained in Example 1 was charged into a platinum container equipped with a nozzle tip at the bottom, and the platinum container was heated to 1150 to 1350° C. to melt the glass cullet to thereby obtain molten glass. Then, the molten glass drawn out through the nozzle tip and wound to a winding apparatus. Then, the heating temperature of the platinum container was adjusted, and the winding apparatus was rotated to wind the glass fiber to the winding apparatus at a spinning temperature in the range of 1150 to 1350° C. appropriate for the glass composition of each Example and at a spinning speed in the range of 800 to 1100 rpm appropriate for the glass composition of each Example to obtain a glass fiber sample having a fiber diameter of 13.0 μm.

Next, in accordance with K. Sebastian. et al., Glass Science and Technology, Vol. 75, pp. 263-270 (2020), the glass fiber sample was cut to a length of 1 to 3 mm, which length can fit to an in-line filter holder, and used as a glass fiber sample for elution test. An elution test was performed in such a manner that the above glass fiber sample for elution test was mounted on a membrane filter installed in an in-line filter holder, the above artificial lung fluid warmed to 37° C. was pumped into the in-line filter holder at a flow rate of 140 to 170 mL/day, and the filtrate that passed through the test glass powder sample and the filter holder was stored in a container. At this time, the mass of the sample mounted on the membrane filter was adjusted such that the ratio of the flow rate of the artificial lung fluid (unit: $\mu m^3/s$) to the sample surface area (unit: $\mu m^2$) (flow rate of the artificial lung fluid/sample surface area) was 0.030±0.005 μm/s. After the elapse of 24 hours, the filtrate was recovered from the container, Si and Al were taken as ions to be analyzed, ion components eluted in the filtrate were quantified using inductively coupled plasma mass spectrometry (ICP-MS), and the ICP-MS quantitative results of Si and Al (μg) were divided by 24 hours to calculate the elution rate (μg/h) of each component. The results are shown in Table 5.

Example 9

In the present Example, a glass fiber sample having a fiber diameter of 13.0 μm in the entirely same manner as in Example 8, except for using the glass cullet obtained in Example 4.

Next, an elution test was performed entirely in the same manner as in Example 8 except for using the glass fiber sample having a fiber diameter of 13.0 μm obtained in the present Example, and the elution rate (μg/h) of each component was calculated. The results are shown in Table 5.

TABLE 2

| | | Example 1 | Example 2 | Example 3 | Example 4 |
|---|---|---|---|---|---|
| | SiO$_2$ (wt %); S | 39.5 | 46.8 | 41.4 | 44.2 |
| | B$_2$O$_3$ (wt %); B | 18.4 | 24.1 | 19.3 | 18.4 |
| | Al$_2$O$_3$ (wt %); A | 24.1 | 15.8 | 24.4 | 23.8 |
| | CaO (wt %); C | 18.0 | 13.3 | 9.3 | 13.6 |
| | MgO (wt %); M | 0 | 0 | 5.6 | 0 |
| | TiO$_2$ (wt %) | 0 | 0 | 0 | 0 |
| | C + M | 18.0 | 13.3 | 14.9 | 13.6 |
| | S + B + A + C + M | 100.0 | 100.0 | 100.0 | 100.0 |
| | (A + 0.9 × B)$^3$ × (3 × C + 2 × M)/S$^3$ | 58.9 | 20.5 | 40.2 | 31.0 |
| | S × (C + M)/(A + B) | 16.7 | 15.6 | 14.1 | 14.2 |
| | Long fiber formation | A | A | A | A |
| Glass bio-solubility | Amount of SiO$_2$ eluted (μg/h) | 82.2 | 62.8 | 52.6 | 56.3 |
| | Amount of Al$_2$O$_3$ eluted (μg/h) | 60.4 | 46.1 | 58.8 | 52.3 |
| | Amount of Al$_2$O$_3$ eluted/amount of SiO$_2$ eluted | 0.73 | 0.73 | 1.12 | 0.93 |
| | Total amount eluted (μg/h) | 142.6 | 108.9 | 111.4 | 108.6 |

TABLE 3

| | | Example 5 | Example 6 | Example 7 |
|---|---|---|---|---|
| | SiO$_2$ (wt %); S | 41.4 | 44.9 | 44.0 |
| | B$_2$O$_3$ (wt %); B | 24.9 | 18.8 | 14.8 |
| | Al$_2$O$_3$ (wt %); A | 15.7 | 24.0 | 23.6 |
| | CaO (wt %); C | 18.0 | 10.0 | 17.6 |
| | MgO (wt %); M | 0 | 2.3 | 0 |
| | TiO$_2$ (wt %) | 0 | 0 | 0 |
| | C + M | 18.0 | 12.3 | 17.6 |
| | S + B + A + C + M | 100.0 | 100.0 | 100.0 |
| | (A + 0.9 × B)$^3$ × (3 × C + 2 × M)/S$^3$ | 42.1 | 26.2 | 31.2 |
| | S × (C + M)/(A + B) | 18.4 | 12.9 | 20.17 |
| | Long fiber formation | A | B | B |
| Glass bio-solubility | Amount of SiO$_2$ eluted (μg/h) | 74.8 | 51.8 | 47.4 |
| | Amount of Al$_2$O$_3$ eluted (μg/h) | 34.5 | 55.8 | 56.1 |
| | Amount of Al$_2$O$_3$ eluted/amount of SiO$_2$ eluted | 0.46 | 1.08 | 1.18 |
| | Total amount eluted (μg/h) | 109.3 | 107.6 | 103.5 |

TABLE 4

| | Comparative Example 1 | Comparative Example 2 | Comparative Example 3 |
|---|---|---|---|
| SiO$_2$ (wt %); S | 46.0 | 41.1 | 46.0 |
| B$_2$O$_3$ (wt %); B | 21.3 | 26.5 | 21.3 |
| Al$_2$O$_3$ (wt %); A | 23.4 | 23.2 | 15.6 |
| CaO (wt %); C | 0 | 0 | 17.1 |
| MgO (wt %); M | 9.3 | 9.2 | 0 |
| TiO$_2$ (wt %) | 0 | 0 | 0 |
| C + M | 9.3 | 9.2 | 17.1 |
| S + B + A + C + M | 100.0 | 100.0 | 100.0 |
| (A + 0.9 × B)$^3$ × (3 × C + 2 × M)/S$^3$ | 14.7 | 27.6 | 22.2 |
| S × (C + M)/(A + B) | 9.6 | 7.6 | 21.3 |
| Long fiber formation | C | C | A |

TABLE 4-continued

| | | Com-parative Example 1 | Com-parative Example 2 | Com-parative Example 3 |
|---|---|---|---|---|
| Glass bio-solubility | Amount of $SiO_2$ eluted (μg/h) | 85.3 | 46.6 | 27.4 |
| | Amount of $Al_2O_3$ eluted (μg/h) | 94.9 | 50.0 | 14.3 |
| | Amount of $Al_2O_3$ eluted/amount of $SiO_2$ eluted | 1.11 | 1.07 | 0.52 |
| | Total amount eluted (μg/h) | 180.2 | 96.6 | 41.7 |

TABLE 5

| | | Example 8 | Example 9 |
|---|---|---|---|
| | $SiO_2$ (wt %); S | 39.5 | 44.2 |
| | $B_2O_3$ (wt %); B | 18.4 | 18.4 |
| | $Al_2O_3$ (wt %); A | 24.1 | 23.8 |
| | CaO (wt %); C | 18.0 | 13.6 |
| | MgO (wt %); M | 0 | 0 |
| | $TiO_2$ (wt %) | 0 | 0 |
| | C + M | 18.0 | 13.6 |
| | S + B + A + C + M | 100.0 | 100.0 |
| | $(A + 0.9 \times B)^3 \times (3 \times C + 2 \times M)/S^3$ | 58.9 | 31.0 |
| | $S \times (C + M)/(A + B)$ | 16.7 | 14.2 |
| | Long fiber formation | A | A |
| Glass long fiber biosolubility | Amount of $SiO_2$ eluted (μg/h) | 77.3 | 54.9 |
| | Amount of $Al_2O_3$ eluted (μg/h) | 70.0 | 57.3 |
| | Amount of $Al_2O_3$ eluted/amount of $SiO_2$ eluted | 0.91 | 1.04 |
| | Total amount eluted (μg/h) | 147.3 | 112.2 |

As seen in Table 1 to Table 4, the glass powder samples obtained from the glass compositions for glass fibers of Examples 1 to 7 have a total elution rate of $SiO_2$ and $Al_2O_3$ of 103.5 μg/h or more, comprise biosolubility, and additionally can achieve long fiber formation. In contrast, the glass powder of the glass composition for glass fiber of Comparative Example 1 has a total elution rate of $SiO_2$ and $Al_2O_3$ of 180.2 μg/h or more and comprises excellent biosolubility, but clearly having poor long fiber forming ability. The glass powder obtained from the glass composition for glass fiber of Comparative Example 2 exhibits a total elution rate of $SiO_2$ and $Al_2O_3$ of 96.6 μg/h, which is a relatively high value, but clearly having poor long fiber forming ability. The glass powder obtained from the glass composition for glass fiber of Comparative Example 3, although achieving long fiber formation, has a total elution rate of $SiO_2$ and $Al_2O_3$ of 41.7 μg/h, clearly having poor biosolubility.

As seen in Table 5, the glass fiber samples of Examples 8 and 9 comprise biosolubility equivalent to the glass powder samples of Examples 1 and 4, which have been obtained from the same glass composition for glass fiber. Accordingly, it is considered to be highly probable that the glass fiber samples obtained from the glass compositions for glass fiber of Examples 2, 3, and 5 to 7 also comprise biosolubility equivalent to that of the glass powder samples of Examples 2, 3, and 5 to 7.

The invention claimed is:

1. A glass composition for glass fiber, comprising:
$SiO_2$ in a range of 35.0 to 55.0% by mass;
$B_2O_3$ in a range of 10.0 to 30.0% by mass;
$Al_2O_3$ in a range of 14.5 to 30.0% by mass;
a total content of $Li_2O$, $Na_2O$ and $K_2O$ in a range of 0 to 0.4% by mass; and
CaO and MgO in a range of 8.7 to 25.0% by mass in total, with respect to a total amount, wherein
a content S of $SiO_2$, a content B of $B_2O_3$, a content A of $Al_2O_3$, a content C of CaO, and a content M of MgO satisfy following formulas (1) and (2):

$$11.3 \le S \times (C+M)/(A+B) \le 20.7 \tag{1},$$

$$12.5 \le (A+0.9 \times B)^3 \times (3 \times C + 2 \times M)/S^3 \le 70.2 \tag{2}.$$

2. The glass composition for glass fiber according to claim 1, wherein the S, B, A, C, and M satisfy following formula (3):

$$11.3 \le S \times (C+M)/(A+B) \le 19.3 \tag{3}.$$

3. The glass composition for glass fiber according to claim 1, comprising:
$SiO_2$ in a range of 37.0 to 49.5% by mass;
$B_2O_3$ in a range of 16.5 to 29.0% by mass;
$Al_2O_3$ in a range of 15.0 to 28.0% by mass;
CaO in a range of 10.5 to 21.0% by mass;
MgO in a range of 0 to 6.5% by mass; and
$TiO_2$ in a range of 0 to 0.4% by mass,
with respect to the total amount.

4. The glass composition for glass fiber according to claim 1, wherein the S, B, A, C, and M satisfy following formula (4):

$$13.6 \le S \times (C+M)/(A+B) \le 17.5 \tag{4}.$$

5. The glass composition for glass fiber according to claim 1, wherein the S, B, A, C, and M satisfy following formula (5):

$$16.2 \le S \times (C+M)/(A+B) \le 17.2 \tag{5}.$$

6. The glass composition for glass fiber according to claim 1, wherein the S, B, A, C, and M satisfy following formula (6):

$$16.6 \le S \times (C+M)/(A+B) \le 16.9 \tag{6}.$$

7. Glass fiber comprising glass filaments formed of the glass composition for glass fiber according to claim 1.

8. The glass fiber according to claim 7, wherein a filament diameter of each of the glass filament is less than 3.0 μm.

9. A glass fiber woven fabric comprising the glass fiber according to claim 7.

10. A glass fiber-reinforced resin composition comprising the glass fiber according to claim 7.

* * * * *